(12) United States Patent
Junqua

(10) Patent No.: US 6,598,018 B1
(45) Date of Patent: Jul. 22, 2003

(54) METHOD FOR NATURAL DIALOG INTERFACE TO CAR DEVICES

(75) Inventor: Jean-Claude Junqua, Santa Barbara, CA (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/464,016

(22) Filed: Dec. 15, 1999

(51) Int. Cl.⁷ .............................................. G10L 15/04
(52) U.S. Cl. ........................ 704/251; 704/275; 704/9; 704/257; 704/254; 704/231; 704/258
(58) Field of Search ................................ 704/275, 257, 704/9, 270, 260, 277, 254, 256, 231, 251, 258

(56) References Cited

U.S. PATENT DOCUMENTS

| | | | |
|---|---|---|---|
| 5,357,596 A | | 10/1994 | Takebayashi et al. |
| 5,577,165 A | | 11/1996 | Takebayashi et al. |
| 5,584,024 A | | 12/1996 | Shwartz |
| 5,671,329 A | | 9/1997 | Hatazaki |
| 5,675,707 A | * | 10/1997 | Gorin et al. ................ 704/251 |
| 5,685,000 A | | 11/1997 | Cox, Jr. |
| 5,748,841 A | * | 5/1998 | Morin et al. ................ 704/257 |
| 5,797,123 A | | 8/1998 | Chou et al. |
| 5,809,269 A | * | 9/1998 | Favot et al. ................ 704/231 |
| 5,892,813 A | | 4/1999 | Morin et al. |
| 6,018,710 A | * | 1/2000 | Wynblatt et al. ........... 704/243 |
| 6,073,102 A | * | 6/2000 | Block ......................... 704/272 |
| 6,233,561 B1 | * | 5/2001 | Junqua et al. .............. 704/257 |
| 6,236,968 B1 | * | 5/2001 | Kanevsky et al. .......... 704/270 |
| 6,246,981 B1 | * | 6/2001 | Papineni et al. ............ 704/235 |
| 6,295,502 B1 | * | 9/2001 | Hancock et al. ............ 701/201 |
| 6,311,159 B1 | * | 10/2001 | Van Tichelen et al. ..... 704/251 |
| 6,314,398 B1 | * | 11/2001 | Junqua et al. .............. 704/257 |
| 6,418,424 B1 | * | 7/2002 | Hoffberg et al. ............. 706/21 |

* cited by examiner

*Primary Examiner*—Vijay Chawan
(74) *Attorney, Agent, or Firm*—Harness, Dickey & Pierce, PLC

(57) ABSTRACT

A computer-implemented method and apparatus for processing a spoken request from a user to control an automobile device. A speech recognizer recognizes a user's speech input and a speech understanding module determines semantic components of the speech input. A dialogue manager determines insufficiency in the input speech, and also provides the user with information about a device in response to the input speech.

18 Claims, 4 Drawing Sheets

METHOD FOR NATURAL DIALOG INTERFACE TO CAR DEVICES

BACKGROUND AND SUMMARY OF THE INVENTION

The present invention relates generally to an automobile device controller and, more particularly, to an apparatus and method for using natural dialog to control operation of an automobile system, such as a navigation system.

In the field of operator controlled automobile systems and devices, the increasing use of technology has resulted in several useful, systems. For example, global positioning systems (GPS) in combination with road atlases stored in a database on the vehicle provide an intelligent navigation system for directing the driver. As another example, car audio systems integrate radio receivers, cassette tape decks, and single or multiple-disk compact disk players into a single system that often includes several modes of operation. Regardless of the vehicle system, such complex systems are generally operated by push button, remote control, or on-screen displays. Operation of such systems distract the vehicle operator from devoting full attention and concentration to safely operating the vehicle.

The present invention is directed to an apparatus for providing a natural dialog interface for a device installed on an automobile. The interface includes a speech recognizer, the speech recognizer recognizes input speech provided by a user. A speech understanding module connects to the speech recognizer. The speech understanding module determines semantic components of the input speech. A dialog manager connects to the speech understanding module. The dialog manager determines a condition of insufficient semantic information existing within the input speech based upon the determined semantic components and provides information to the user about the device in response to the input speech.

For a more complete understanding of the invention, its objects and advantages, reference should be made to the following specification and to the accompanying drawings.

DESCRIPTION OF THE PREFERRED EMBODIMENT

Figure 1:
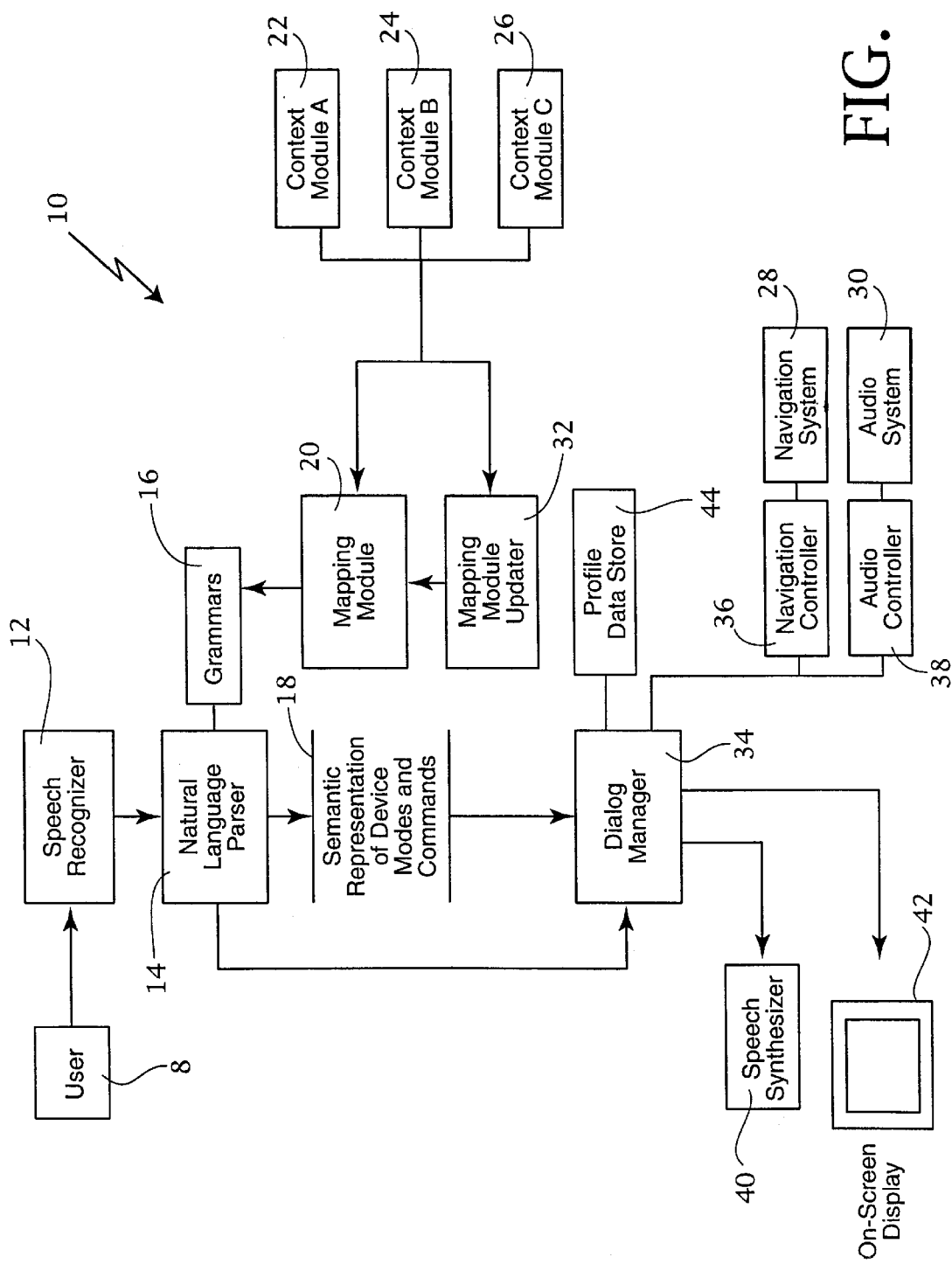
FIG. 1 is a block diagram of a natural dialog interface arranged in accordance with the principles of the present invention.

A presently preferred embodiment of the natural language interface 10 arranged in accordance with the principles of the present invention is illustrated in FIG. 1. Input speech from the user 8 is supplied through a suitable audio interface and digitizer for input to speech recognizer 12. The output of speech recognizer 12 is supplied to a natural language parser 14.

Natural language parser 14 works in conjunction with a set of grammars 16 that define the semantics of what natural language parser 14 can understand. The details of the parser are discussed more fully below. Essentially, however, the parser operates on a goal-oriented basis identifying key words and phrases from the recognized speech and using those recognized words and phrases to fill slots in pre-defined templates or frames that represent different goal-oriented tasks. Natural language parser 14 also works in conjunction with a semantic representation of the automobile device modes and commands 18 of the devices controlled by natural language interface 10. The device modes and commands in each device are stored in grammars 16. Natural language parser 14 thus consults the semantic representation of device modes and commands 18 to determine what responses to present to the user and what control commands to output to device controllers as will be described herein.

Because natural language interface 10 enables the user to interact with devices, the number of which, their modes, and commands may be constantly changing, a mechanism enables downloading the latest devices, modes, and commands into grammars 16 of natural language parser 14. This function is performed by mapping module 20. Mapping module 20 downloads electronic device, mode, and command information from one or a number of context modules 22, 24, 26. Context modules 22, 24, 26 provide device mode and command information to mapping module 20 to facilitate identification of key words and phrases by natural language parser 14.

The subject invention will be described with particular respect to natural language interface 10 operating a navigation system and an audio system. More particularly, context module A 22 and context module B 24 supply navigation-related context information to natural language parser 14. More specifically, context module A 22 provides context information to support operation of navigation system 28. Navigation system 28 provides directions and other navigation information to user 8. Context module A 22 represents a navigation module such as a map database stored within the vehicle or downloaded via a telecommunication connection. Context module B 24 also provides navigation information from an alternate source, such as a global positioning system (GPS) receiver. Similarly, context module C 26 provides information to natural language parser 14 for facilitating identification of keywords and phrases from the recognized speech such as for an audio system 30. Audio system 30 may comprise one or a combination of radio, cassette tape deck, compact disk player, or multi-compact disk player.

Returning to mapping module 20, mapping module 20 downloads the electronic context information from context modules 22, 24, 26 into grammars 16 for use by natural language parser 14. Mapping module 20 has a priori knowledge of the overall structure of the devices, modes and commands downloaded from context modules 22, 24, 26. Mapping module 20 would thus be aware that context modules 22, 24, 26, provide information on both navigation and audio. Mapping module 20 then uses this a priori knowledge to map the information into grammars 16.

From time to time, a context module or system controlled through natural language interface 10 may change. Upon such an occurrence, natural language interface 10 must accommodate such a change by including a mapping module updater 32. Mapping module updater 32 receives update information over one or a number of the Internet, a telecommunication link, or directly from a newly added context module. If the overall structure of context information provided by context modules 22, 24, 26 changes so that mapping module 20 no longer correctly maps context information into grammars 16, mapping module updater 32 updates mapping module 20.

In a particular aspect of the subject invention, natural language interface 10 includes a dialog manager 34 which generates commands to a navigation controller 36 which in turn generates control commands for navigation system 28 or audio system 30. As described above, navigation system 28 may be represented as a GPS receiver or other radio navigation device, a dead reckoning system, a mapping and direction system or the like. Dialog manager 34 generates control requests to navigation controller 36 which in turn generates control commands to navigation system 28. Such commands include setting desired start points, destination points, intermediate points, as well as requesting various useful navigation information. Similarly, dialog manager 34 generates control commands to audio controller 38 which in turn generates control commands to audio system 30. Audio controller 38 may generate commands to control operation or request information from the audio components, including present radio station, present order of play of compact disk player, volume, audio levels and the like.

In some situations, the user 8 does not provide sufficient information for dialog manager 34 to generate control requests to navigation controller 36 or audio controller 38. In such situations, dialog manager 34 utilizes the output of natural language parser 14 to capture the user's requests so that command requests can be properly generated to navigation controller 36 or audio controller 38. Dialog manager 34 then generates control commands to navigation controller 36, which in turn generates control commands for navigation system 28. Similarly, after refining the user's request, dialog manager 34 generates control commands to audio controller 38 which in turn generates control commands to audio system 30.

In some situations, even with context information, the user does not provide sufficient information for dialog manager 34 to generate control requests to navigation controller 36 or audio controller 38. In such situations, dialog manager 34 generates speech commands to speech synthesizer 40 and/or on-screen display 42 to prompt the user for additional information or clarification of existing information. Speech synthesizer 40 preferably utilizes a frame-text to speech system, which is a system where a sentence to -synthesize includes a fixed part and variable slots, in order to synthesize inquiries output by dialog manager 34.

By virtue of utilizing a semantic representation of the context information, natural language interface 10 performs a filtering of the information contained in context modules 22, 24, 26. Further, dialog manager 34 operates in conjunction with a profile data store 44. Profile data store 44 contains user profile information. Such information may include, with respect to navigation, recent geographical locations where the user has operated the vehicle or has requested directions. With respect to the audio system, such information may include radio system presets, musical selection from a compact disk player, audio system volume, or other tonal controls. Data profile store 44 contains data for voice identification techniques or adaptive recognition. Further, in certain modes, identification of particular users may enable dialog manager 34 to preset any and all vehicle systems to predefined user preferences for any and all vehicle systems interconnected to dialog manager 34.

By way of an example for operating a vehicle navigation system, natural language parser 14 may define a semantic frame associated with each command. A semantic frame includes slots for a geographical location, such as may be defined by zip code, intersection of two roads, a local landmark or point of interest, or other predefined location. One or several of these slots must be defined for the frame to be activated. The user may fill the semantic frame using natural speech. For example, the user may input "I am now on State Street and I want to go to Santa Barbara Street." By analyzing the sentence and understanding key phrases such as "now" and "I want to go to", natural language interface 10 may automatically determine a start and end point for input to navigation system 28 via navigation controller 36. Suppose that more than two State Streets exist in a city, by virtue of input from context modules 22 and 24, natural language interface 10 may detect the ambiguity, and dialog manager 34 may output an inquiry through speech synthesizer 40. Such an inquiry may seek to determine whether the user is near a particularly well known landmark in the vicinity of one of the State Streets. Based on the response, dialog manager 34 generates the particular commands. Alternatively, if one of the context modules provides GPS information, such information may be utilized to determine on which of the two State Streets the user is traveling.

Figure 2:
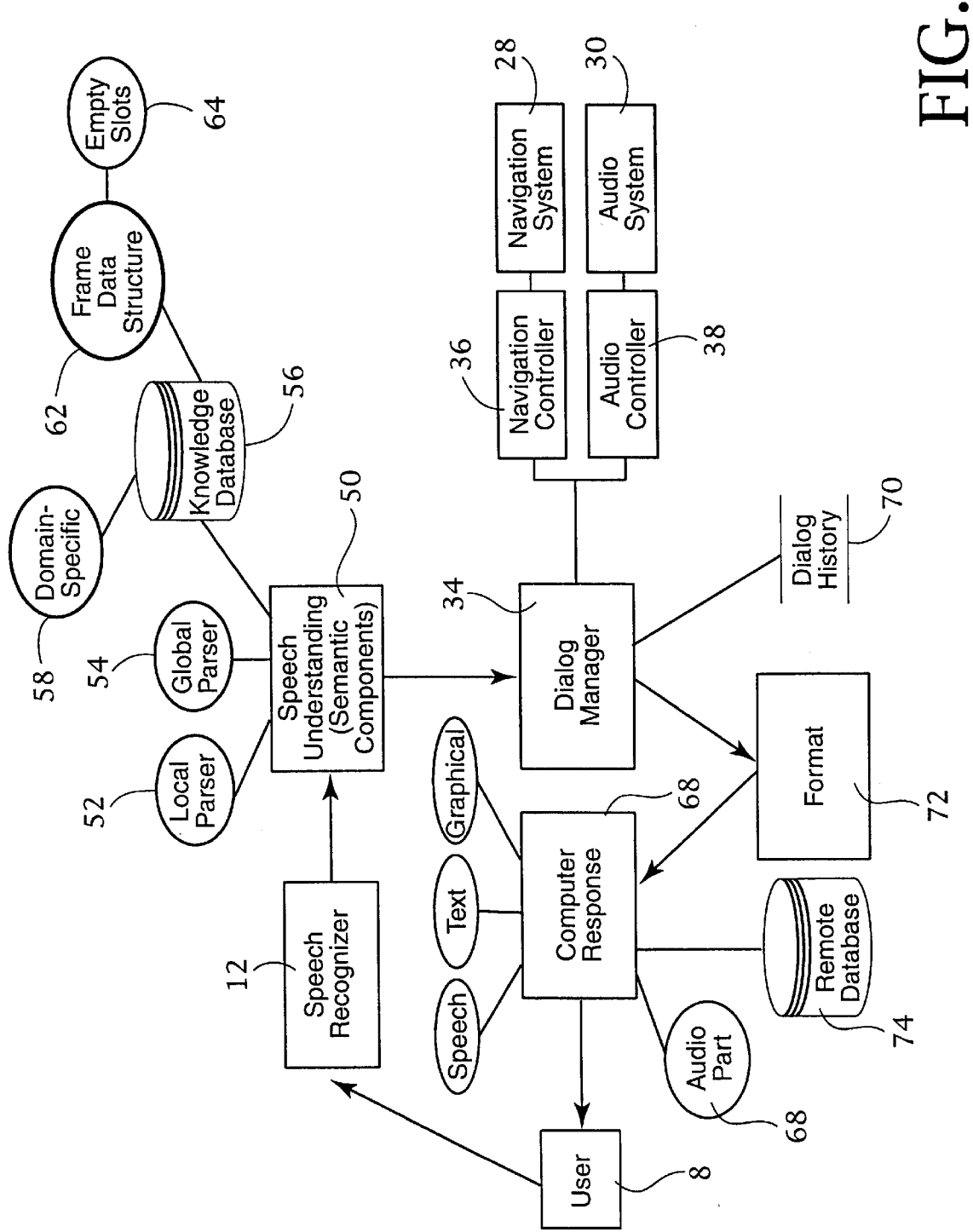
FIG. 2 is a block diagram depicting the components of natural language parser of FIG. 1.

FIG. 2 depicts components of natural language interface 10 in greater detail. In particular, speech understanding module 50 includes a local parser 52 to identify the predetermined, relevant task-related fragments. Speech understanding module 50 also includes a global parser 54 to extract the overall semantics of the request of the user.

Local parser 52 utilizes in a preferred embodiment small and multiple grammars along with several passes and a unique scoring mechanism to parse hypotheses. For example, local parser 52 recognizes according to this approach phrases such as addresses, intersections, landmarks, zip codes and the like with respect to navigation, and music tracks, tonal controls, and the like, with respect to audio systems. If the speaker utters "I am know on State Street and I want to go to Santa Barbara Street", the local parser recognizes "State Street" and "Santa Barbara Street" as locations, and extracts this semantic information. Global parser 54 assembles these items in the context of the entire sentence and recognizes that the speaker wishes to go from State Street, which is the present location, to Santa Barbara Street, which is the target location.

Speech understanding module 50 includes knowledge database 56 which encodes the semantics of a domain. In this sense, knowledge database 56 is preferably a domain-specific database as depicted by reference numeral 58, and is utilized by dialog manager 34 to determine whether a particular action related to achieving a predetermined goal is possible.

The preferred embodiment encodes the semantics via a frame data structure 62. Frame data structure 62 contains empty slots 64 which are filled when the semantic interpretation of global parser 54 matches the frame. For example, a frame data structure, whose domain is navigation commands, includes empty slots for specifying the start and end location. If user 8 has provided a proper start and end location, then the empty slots are filled with this information. However, if that particular frame is not completely filled after user 8 has initially provided speech input, dialog manager 34 instructs computer response module 68 to ask user 8 to provide the remaining information, whether the remaining information is the start or end location.

The frame data structure 62 preferably includes multiple frames each of which in turn has multiple slots. One frame may have slots directed to specific attributes of navigation, such as start and end points, distance to predetermined points, and the like. Other frames may have attributes directed to various aspects of audio system control, including station presets, CD selection, and tonal selection. The following reference discusses local and global parsers and frames: R Kuhn and R. D. Mori *Spoken Dialogs With*

*Computers* (Chapter 14: Sentence Interpretation), Academic Press, Boston (1998).

Dialog manager 34 uses dialog history data file 70 to assist in filling empty slots before requesting user 8 for specific information. Dialog history data file 70 contains a log of conversations through the natural language interface 10. For example, if the speaker states "I am now on State Street and I want to go to Santa Barbara Street," dialog manager 34 examines the dialog history file 70 to determine what start and end locations user 8 has already selected or rejected in previous dialog exchange. If user 8 has previously selected a State Street in a, for example, northern section of the city, dialog manager 34 fills the empty slot with the start location with that particular State Street. If a sufficient number of slots have been filled, natural language interface 10 will ask user 8 to verify and confirm the program selection. Thus, if any assumptions made by dialog manager 34 through use of dialog history data file 70 prove to be incorrect, the speaker can correct the assumption.

Preferably, computer response module 68 is multi-modal and provides a response to user 8 via speech synthesis, text or graphical. For example, if user 8 has requested directions to a particular location, computer response module 68 could display a graphical map with the terms spoken by the user displayed on the map after being formatted by format module 72. Moreover, computer response module 68 can speak the directions to the user using speech synthesis. In one embodiment, computer response module 68 uses the semantics that have been recognized to generate a sentence based on the semantic concept. Alternatively, sentences are automatically generated based on per type sentences which have been constructed from slots available in a semantic frame. However, one skilled in the art will recognize that the present invention is not limited to having all three modes present, as it can contain one or more of the modes of the computer response module 68.

In another embodiment, dialog manager 34 instructs computer response module 68 to perform a search on remote database 74 in order to provide user 8 with timely traffic information about routes between the start or end locations. Remote database 74 can perform communications with dialog manager 68 through conventional methods, such as via a radio frequency communication mode. This alternative embodiment substantially improves the dialog between user 8 and dialog manager 34 by providing information to user 8 so that user 8 can formulate an improved request through natural language interface 10.

Dialog manager 34 assumes an integral roll in the dialog by performing a back-and-forth with user 8 before initiating a command request to navigation controller 36 or audio controller 38. In such a roll, dialog manager 34 utilizes teachings of the present invention to effectively manage the turn-taking aspects of human-like back-and-forth dialog. Dialog manager 34 is able to make its own decision about which direction the dialog with user 8 will take next and when to initiate when a new direction.

For example, if user 8 has requested to go from a particular start point to a particular end point, dialog manager 34 determines whether such a start point or end point prove logical given the context information given by context modules 22, 24. Such a determination may be made based on input from context module A 22 or context module B 24. In this example, if dialog manager 34 determines that such a start location is not logical, however, dialog manager 34 selects a more likely, alternative start location, based on GPS positioning information. Thus, dialog manager 34 can determine whether a particular action or goal of the user is feasible to assist the user to accomplish this goal.

Natural language parser 14 analyzes and extracts semantically important and meaningful topics from a loosely structured natural language text which may have been generated as the output of an automatic speech recognition (ASR) system used by a dialog or speech understanding system. Natural language parser 14 translates the natural language text input to a new representation by generating well-structured tags containing topic information and data, and associating each tag with the segments of the input text containing the tagged information. In addition, tags may be generated in other forms such as a separate list, or as a semantic frame.

Preferably, natural language parser 14 includes a robust design to enable the input of grammatically incorrect English sentences, due to the following reasons: the input to the recognizer is casual, dialog style, natural speech that can contain broken sentences, partial phrases, and the insertion, omission, or mis-recognition of errors by speech recognizer 12, even when the speech input is considered correct. Natural language parser 14 deals robustly with all types of input and extracts as much information as possible.

Figure 3A:
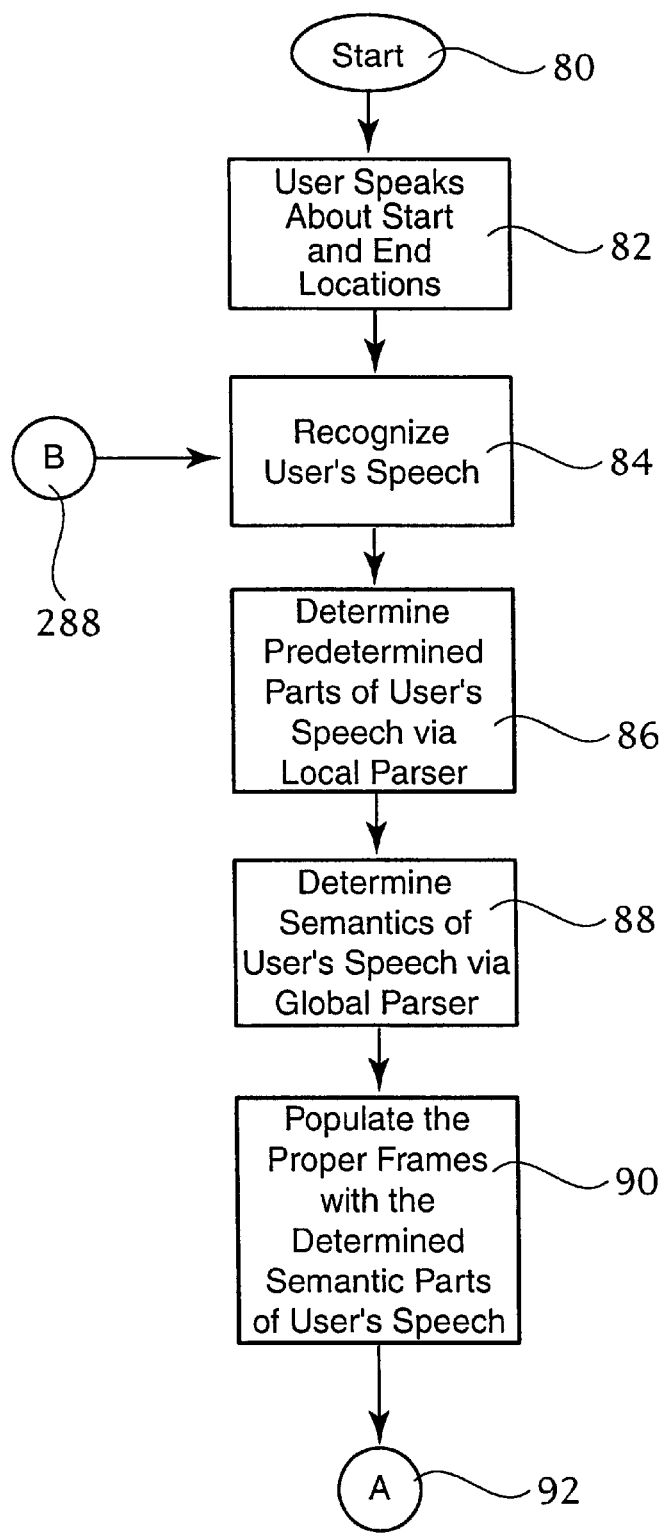
FIGS. 3a–3b are flow charts depicting the operation of the natural dialog interface.
Figure 3B:
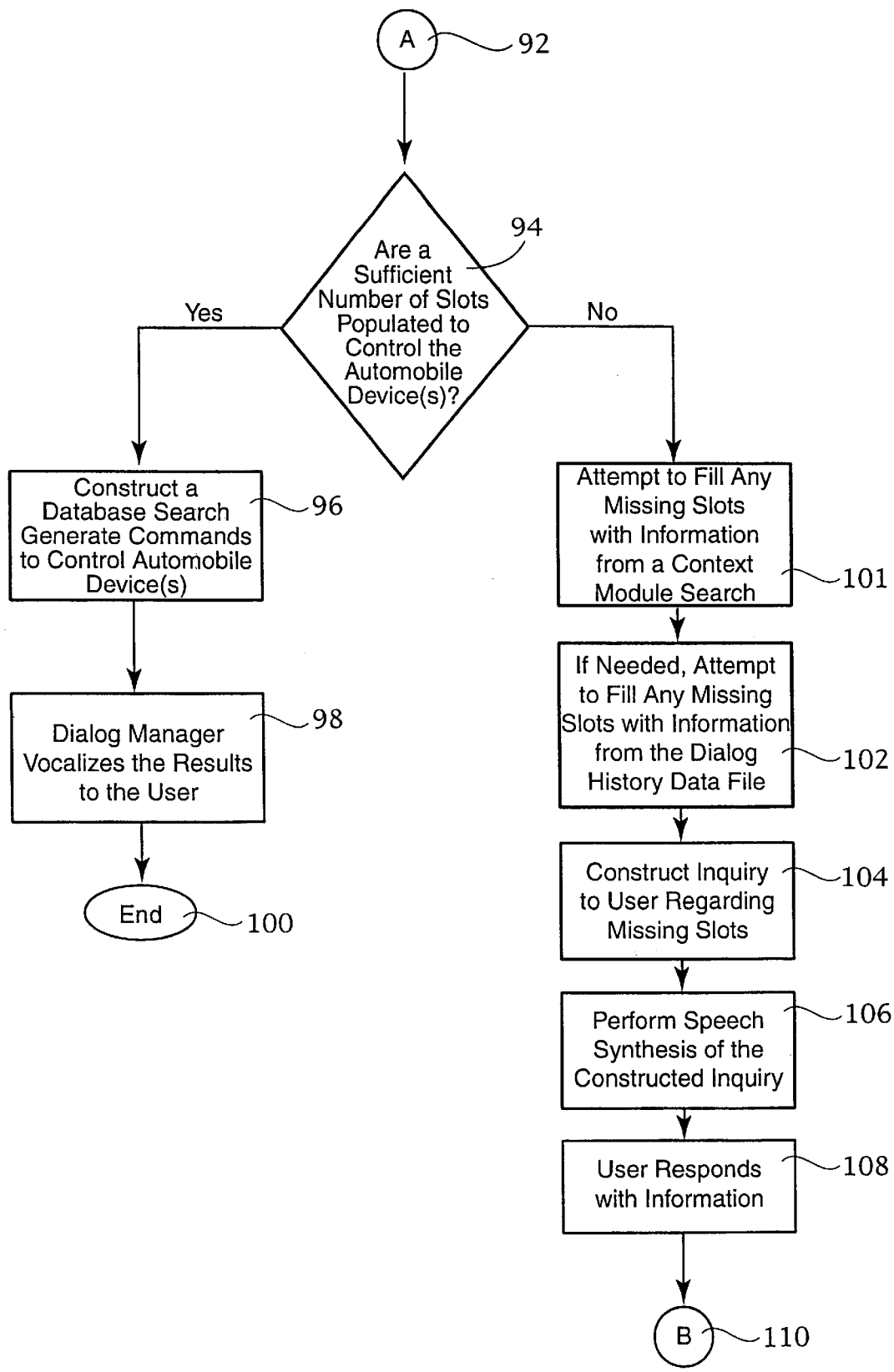

FIGS. 3*a*–3*b* depict operations steps associated with the dialog speech processing system of FIG. 2. FIGS. 3*a*–3*b* will be described with respect to control of a navigation system. One skilled in the art will recognize that these operations may apply equally to an audio system. Start block 80 indicates that process block 82 is to be processed. At process block 82, the user speaks to the device of the present invention about being at a present location and desiring to go to a target location. At process block 84, the user's speech is recognized by the present invention, and at process block 86, predetermined words or phrases of the user's speech are recognized, such as phrases about start or end locations.

Control next proceeds to process block 88. Process block 88 determines the semantic parts of the user's speech by utilizing the local and global parser. Control then proceeds to process block 90 which populates the proper frames with the determined semantic parts of the user's speech. Control then proceeds to continuation block.A 92, which leads to FIG. 3*b*.

With reference to FIG. 3*b*, decision block 94 determines whether a sufficient number of slots have been populated to control the automobile device(s). If a sufficient number of slots have been populated to control the device(s), control proceeds to process block 96 which generates commands to control the automobile device(s). Control then proceeds to process block 98 where dialog manager vocalizes the result of the command to the user. After vocalization of the result, processing terminates at end block 100.

If decision block 94 determines that an insufficient number of slots have been populated to control the automobile device(s), process block 101 attempts to fill any missing slots with information from a context module search. For example, if the user has specified a start destination, but has not provided a starting point, the present invention queries information provided by the context modules in order to determine possible start points. If necessary, control proceeds to process block 102 which attempts to fill any missing slots with information from the dialog history file. Process block 104 constructs an inquiry to the user regarding the missing slots which have not yet been filled. Process block 106 performs speech synthesis of the constructed inquiry, and at process block 108, the user responds with the information. Control then proceeds, via continuation block 110, back to recognized user's speech 84.

While the invention has been described in its presently preferred form, it is to be understood that there are numerous applications and implementations for the present invention. Accordingly, the invention is capable of modification and changes without departing from the spirit of the invention as set forth in the appended claims.

What is claimed is:

1. An apparatus for providing a natural dialog interface for a device installed on an automobile, comprising:
   a speech recognizer, the speech recognizer recognizing input speech provided by a user;
   a speech understanding module connected to the speech recognizer, the speech understanding module determining semantic components of the input speech using a set of grammars;
   a mapping module updating the set of grammars using at least one context module, the context module providing information about the devices;
   a dialog manager connected to the speech understanding module, the dialog manager doing at least one of determining a condition of insufficient semantic information existing within the input speech based upon the determined semantic components and for providing information to the user about the device in response to the input speech.

2. The apparatus of claim 1 further comprising a context module, the context module providing information to the speech understanding module to assist with determining the semantic components of the input speech.

3. The apparatus of claim 1 further comprising a plurality of context modules, each context module providing information to the speech understanding module to assist with determining the semantic components of the input speech.

4. The apparatus of claim 1 further comprising a device controller, the device controller receiving commands from the dialog manager and generating control commands to operate the device.

5. The apparatus of claim 1 wherein the dialog manager includes a speech synthesizer, the speech synthesizer providing the user with synthesized speech information about available selections.

6. The apparatus of claim 1 wherein the speech understanding module is a goal-oriented speech understanding module defining a plurality of goal-oriented frames having slots corresponding to control commands output by the device controller.

7. The apparatus of claim 1 wherein the speech understanding module is a natural language speech understanding module having a set of predefined grammars that correspond to control commands output by the device controller.

8. The apparatus of claim 1 wherein the dialog manager includes a user profile database for storing a representation of past use by a user of the apparatus, and wherein the dialog manager utilizes the profile database.

9. The apparatus of claim 8 wherein the profile database includes at least one of data for voice identification and data for adaptive voice recognition.

10. An apparatus for providing a natural dialog interface for an automobile navigation system, comprising:
    a speech recognizer, the speech recognizer recognizing input speech provided by a user;
    a speech understanding module connected to the speech recognizer, the speech understanding module determining semantic components of the input speech using a set of grammars;
    a mapping module updating the set of grammars using at least one context module, the context module providing information about the devices;
    a dialog manager connected to the speech understanding module, the dialog manager doing at least one of determining a condition of insufficient semantic information for controlling the navigation system existing within the input speech based upon the determined semantic components and for providing information to the user about the navigation system in response to the input speech.

11. The apparatus of claim 10 further comprising a plurality of context modules, each context module providing navigation information to the speech understanding module to assist with determining the semantic components of the input speech.

12. The apparatus of claim 10 further comprising a context module, the context module providing navigation information to the speech understanding module to assist with determining the semantic components of the input speech.

13. The apparatus of claim 12 further comprising a navigation controller, the navigation controller receiving commands from the dialog manager and generating control commands to operate the navigation system.

14. The apparatus of claim 13 wherein the dialog manager includes a speech synthesizer, the speech synthesizer providing the user with synthesized speech information about the navigation system.

15. The apparatus of claim 14 wherein the speech understanding module is a goal-oriented speech understanding module defining a plurality of goal-oriented frames having slots corresponding to control commands output by the navigation controller.

16. The apparatus of claim 15 wherein the speech understanding module is a natural language speech understanding module having a set of predefined grammars that correspond to navigation control commands output by the navigation controller.

17. The apparatus of claim 16 wherein the dialog manager includes a user profile database for storing a representation of past use by a user of the apparatus, and wherein the dialog manager utilizes the profile database.

18. The apparatus of claim 10 wherein the profile database includes at least one of data for voice identification and data for adaptive voice recognition.

* * * * *